Nov. 10, 1931.  J. T. MOORE  1,830,910
WHEEL GUIDE FOR TRACTOR CHAINS
Filed April 6, 1929
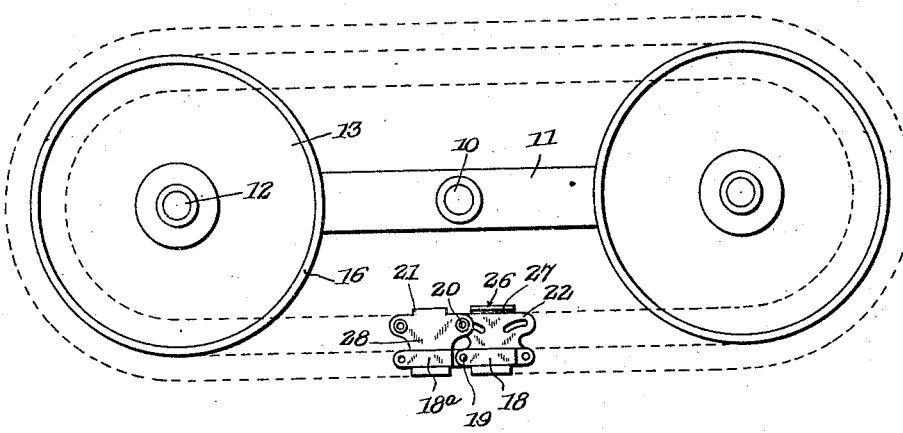
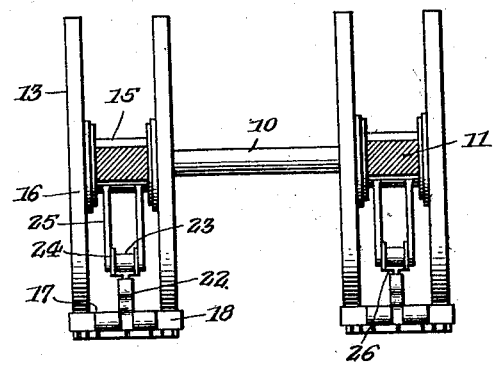
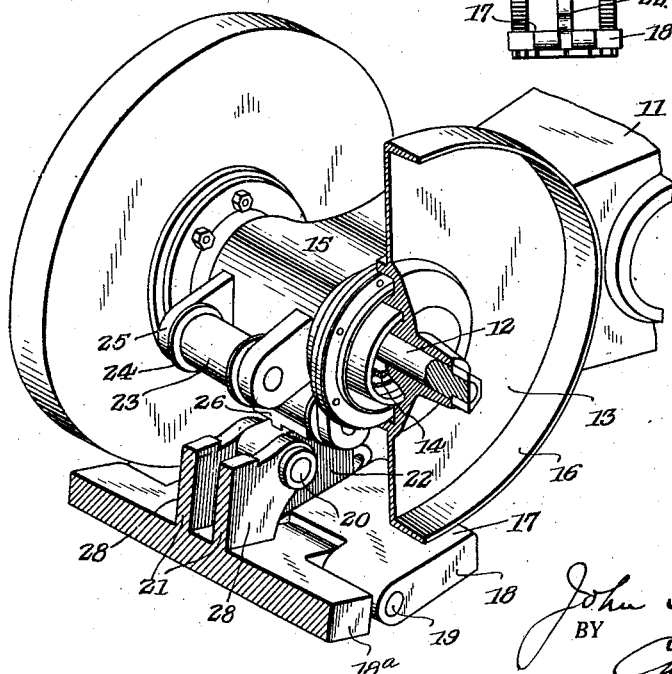
INVENTOR.
John Turner Moore
BY
Church & Church
his ATTORNEYS Patented Nov. 10, 1931

1,830,910

UNITED STATES PATENT OFFICE

JOHN TURNER MOORE, OF READING, PENNSYLVANIA, ASSIGNOR, BY MESNE ASSIGNMENTS, TO REX-WATSON CORPORATION, OF CANASTOTA, NEW YORK, A CORPORATION OF NEW YORK

WHEEL GUIDE FOR TRACTOR CHAINS

Application filed April 6, 1929. Serial No. 353,184.

This invention relates to improvements in endless track mechanisms such as are used on vehicles of the tractor type, such mechanisms comprising a series of articulated tread links which constitute an endless chain forming the surface on which the wheels of the tractor or vehicle travel.

The links constituting said chain have tread portions, one surface of which engages the ground over which the vehicle moves while the other surface supports the wheels of the vehicle. These wheel supporting surfaces are on the upper or inner sides of the links and as the links pass around the wheels it is essential that they be held against any appreciable movement axially of the wheels or laterally of the peripheries thereof. Means for limiting such movement of the links are broadly old, numerous forms of guide means having been formed on the links themselves adjacent the wheel supporting surfaces of the links and adapted to engage or contact with the wheels and thus limit the lateral play of the links. However, in structures such as these there is considerable wear imposed upon the guide members due to the fact that there is an appreciable relative movement of the guide members and wheels as the links come into contact with and move out of contact with the wheels. This relative movement of said parts and the consequent wear imposed thereby on the wear members results in the necessity of frequently replacing the links because the parts become so loose that there is an undue amount of lateral play of the worn links relative to the wheels. With this in mind, the present invention particularly contemplates means for guiding the links or limiting their lateral play with respect to the wheels, wherein the wear imposed upon such guide members is reduced to what is believed to be a minimum.

In its broader aspect, the present invention is disclosed and claimed in applicant's co-pending application Serial No. 342,812, and the present application is more or less limited to one or more specific forms of the invention developed by applicant.

In the present invention it is sought to simplify the construction of the wheels or provide guide members on the vehicle supporting frame for cooperation with guide members on the links. Again, it is sought to utilize anti-friction members for guiding the links so that wear on the guide members of the links will be reduced.

A further object is to provide guiding devices on the vehicle frame that will cooperate with each and every one of the links constituting the link chain.

With these and other objects in view the invention consists in certain details of construction and combinations and arrangements of parts, all as will hereinafter be more fully described and the novel features thereof particularly pointed out in the appended claims.

In the accompanying drawings,—

Figure 1 is a diagrammatical view in side elevation illustrating the spaced side wheels of an ordinary type of cart with an endless link belt tread extending around said wheels, said belt tread being indicated in dotted lines except for two of the links thereof.

Fig. 2 is a sectional view taken transversely of Fig. 1;

Fig. 3 is a perspective view partly in section of a pair of supporting wheels and portions of the frame and link belt.

As illustrated in the accompanying drawings, vehicles of this type comprise a supporting axle 10 for the cart or other type of body and mounted on said axle are axially spaced wheel supporting frames 11. Journaled in the end portions of said frames are the axles 12 for the wheels 13. As shown, axles 12 may be journaled on antifriction elements 14 secured in any desired fashion in the extremities of the frames 11, these extremities, indicated at 15, being of tubular formation so that the axles may extend therethrough. As more clearly illustrated in Fig. 3, the wheels 13 have comparatively broad peripheries or treads 16 which engage the wheel supporting surfaces 17 of the links 18, 18a of the endless link belt. The links 18 which are the male links are hingedly connected to the female links 18a by hinge pins 19 as well as by pins 20 projecting through upstanding ribs 21 on the female links and a similar rib 22 on the male link. This construction is well known and as it is understood in the art that these links constitute an endless chain that extends around the front and rear wheels of each frame with the chain constituting an endless ground engaging track for such wheels, a further description of such parts is believed to be unnecessary.

As has been stated, it is necessary that means be provided for limiting movement of the links laterally of the peripheries of the wheels as they pass around the same, and while such means have heretofore been provided their arrangement and construction has been such that considerable wear was imposed on the links with the resultant reduction in the life of their usefulness, as before pointed out. In order to reduce this wear on the links the present invention, like that disclosed in the co-pending application above identified, contemplates a constructon wherein the co-operating guide surfaces for limiting the lateral movement of the links are located at a point spaced radially inward of the peripheries of the wheels. By doing this, the movement of the guiding surfaces relative to one another as they come into engagement with each other and pass out of engagement with each other, is considerably less than in the case where the guide surfaces engage one another at the periphery of the wheel. Consequently, the amount of wear imposed upon the guide surfaces is correspondingly decreased.

In the present instance, this is accomplished by having laterally spaced guide surfaces on each of the links adapted to cooperate with similarly spaced guide members carried by the body supporting frames 11. As more fully shown in Fig. 3 the guide members on the frame 11 are, in the present instance, in the form of rollers 23 formed with guide flanges 24 and journaled in arms or brackets 25 spaced laterally from one another on the tubular portions 15 of the frames and projecting from said tubular portions a comparatively short distance radially of the wheels 13. There may, if desired, be one or more of these guide rollers 23, two being shown in the present instance, on each of the extremities of the frames 11. These rollers may be of any desired material, but preferably they may be likened to anti-friction elements so as to reduce the wear imposed upon the parts, that is, the wear imposed upon the guide surfaces as they rub against one another during operation of the vehicle.

The individual rollers 23 are spaced circumferentially of the wheels 13 and the flanges 24 on said rollers are spaced laterally apart a distance equal to the spacing of the cooperating guide surfaces on the links 18, 18a.

These guides surfaces on the links are spaced laterally apart, a distance corresponding to the spacing of the guide members carried by the frame. In the case of the male links 18 the upstanding rib 22 has a comparatively broad flange 26 at the top thereof whose sides 27 constitute the guide surfaces for cooperating with the guide surfaces of the frame. In the case of the female links 18a the ribs 21 are necessarily spaced apart in order to receive the end portions of ribs 22 of the adjacent links in the chain. In view of this the width of flange 26 on rib 22 will be made to correspond with the distance between the outer surfaces 28 of the ribs 21 so that said outside surfaces 28 also constitute the guide surfaces on links 18a for co-operation with the guide members on the frame.

With such construction and arrangement of parts, wear on the guide surfaces of the links is reduced not only by the fact that they are located at a point spaced inwardly from the peripheries of the wheels, but also by the fact that anti-friction elements may be used as guide members. In addition, the wheels 13 may be of any form and their construction is greatly simplified. For instance, they may be of the disk type with the disk portion perfectly plane in the region of the hub portion of the periphery of the wheel.

What I claim is:

1. In an endless track mechanism, the combination of a frame, a pair of wheels journaled in said frame, a series of articulated links adapted to travel around said wheels, guides on said links, a pair of bearings formed on said frame, and a guide member journaled in said bearings and engageable with the guides on said links when the latter are in contact with the peripheries of said wheels.

2. In an endless track mechanism, the combination of a frame, a pair of wheels journaled in said frame, a series of articulated links adapted to travel around said wheels, guides on said links and a guide member journaled on said frame and engageable with the guides on said links when the latter engage the peripheries of said wheels, the axis of said guide member being parallel to the axis of said wheels.

3. In an endless track mechanism, the combination of a frame, a pair of axially spaced wheels journaled in said frame, a roller between said wheels rotatable in said frame about an axis parallel to the axis of said wheels, guide surfaces on said roller, a series of articulated links adapted to travel around said wheels, and guides on said links engageable with the guide surfaces on said roller.

4. In an endless track mechanism, the combination of a frame, a pair of axially spaced wheels journaled in the frame, a roller journaled on said frame intermediate the peripheries and the axis of said wheels, guide surfaces on said roller, a series of articulated links adapted to travel around said wheels, and guide surfaces on said links engageable with the guide surfaces on said roller.

5. In an endless track mechanism, the combination of a frame, a pair of axially spaced wheels journaled in said frame, a pair of rollers journaled on said frame between said wheels at points radially inward from the peripheries of the wheels, guides on said rollers, a series of articulated links adapted to travel around said wheels, and guides on said links engageable with the guides on said rollers.

6. In an endless track mechanism, the combination of a frame, a pair of axially spaced wheels journaled in said frame, a pair of rollers journaled on said frame between said wheels at points radially inward from the peripheries of the wheels, guides on said rollers, a series of articulated links adapted to travel around said wheels, ribs on said links, and guide surfaces on said ribs engageable with the guides on said rollers.

7. In an endless track mechanism, the combination of a frame, an axle journaled in said frame, said frame having a tubular portion surrounding said axle, a wheel on said axle at each end of the tubular portion of the frame, pairs of projections on said tubular portion of the frame, guide members mounted on said projections, said members being rotatable on axes parallel to the axis of the axle, a series of articulated links adapted to travel around said wheels, and guides on said links engageable with the guides carried by said frame.

8. In an endless track mechanism, the combination of a frame, a pair of axially spaced wheels journaled in said frame, pairs of projections on said frame intermediate the wheels, guide members mounted on said projections, said members being rotatable on axes parallel to the axis of the axle, a series of articulated links adapted to travel around said wheels, and guides on said links engageable with the guides carried by said frame.

9. In an endless track mechanism, the combination of a frame, a pair of axially spaced wheels journaled in said frame, a pair of projections on said frame between said wheels and radially inward from the peripheries of the wheels, a roller rotatably mounted on said projections, laterally spaced guides formed on said roller, a series of articulated links adapted to travel around said wheels, and guides on said links engageable with the guides on said roller.

JOHN TURNER MOORE.